United States Patent [19]

Okumura et al.

[11] Patent Number: 4,669,434

[45] Date of Patent: Jun. 2, 1987

[54] INTERNAL COMBUSTION ENGINE CYLINDER HEAD VARIABLE SWIRL SIAMESE TYPE INTAKE PORT STRUCTURE, WITH AUXILIARY STRAIGHT PASSAGE, POINTING AT SPARK PLUG, LEADING FROM MIXTURE INTAKE TO DOWNSTREAM END OF STRAIGHT INTAKE PORT

[75] Inventors: Takeshi Okumura; Yoshihiro Iwashita, both of Toyota, Japan

[73] Assignee: Toyota Jidosha Kabushiki Kaisha, Aichi, Japan

[21] Appl. No.: 887,658

[22] Filed: Jul. 21, 1986

[30] Foreign Application Priority Data

Jul. 24, 1985 [JP] Japan .................. 60-163149
Aug. 26, 1985 [JP] Japan .................. 60-186886

[51] Int. Cl.⁴ ............................. F02B 15/00
[52] U.S. Cl. .................... 123/308; 123/432; 123/306; 123/188 M
[58] Field of Search .......... 123/308, 306, 432, 188 M

[56] References Cited

U.S. PATENT DOCUMENTS 4,548,175 10/1985 Kawai et al. ................ 123/308

FOREIGN PATENT DOCUMENTS 151718 11/1979 Japan ...................... 123/308

Primary Examiner—E. Rollins Cross
Attorney, Agent, or Firm—Parkhurst & Oliff

[57] ABSTRACT

A variable swirl siamese type intake port structure for an internal combustion engine cylinder head includes a first generally straight intake passage which leads to a first intake port and a second generally helical intake passage which leads to a second intake port which is formed with a helical end vortex portion. A control valve is fitted in the first generally straight intake passage at an upstream portion thereof so as to control its flow resistance. A substantially straight auxiliary passage, opening from a point upstream of the control valve to a point near the downstream end of the first intake port and bypassing the control valve, points through the first intake port, when open, generally at the ignition point of the engine spark plug. Thereby, when the control valve is closed, even then an air-fuel mixture stream is directed straight at the spark plug, and this prevents local weakening of mixture due to centrifugal effects. Thus good ignition characteristics are obtained, the limit for weakening the air-fuel mixture can be extended, and the engine volumetric efficiency and the maximum attainable engine output power are increased.

9 Claims, 6 Drawing Figures

INTERNAL COMBUSTION ENGINE CYLINDER HEAD VARIABLE SWIRL SIAMESE TYPE INTAKE PORT STRUCTURE, WITH AUXILIARY STRAIGHT PASSAGE, POINTING AT SPARK PLUG, LEADING FROM MIXTURE INTAKE TO DOWNSTREAM END OF STRAIGHT INTAKE PORT

BACKGROUND OF THE INVENTION

The present invention relates to a variable swirl siamese type intake port structure for an internal combustion engine cylinder head, and more particularly relates to such a siamesed type variable swirl intake port structure for an internal combustion engine cylinder head, which incorporates two intake valves (and thus is of the three valve type or the four valve type) and a switchover valve construction for selectively supplying intake air - fuel mixture to said two intake valves in varying proportions, and which is improved as regards air - fuel mixture swirling characteristics and volumetric efficiency in various engine operational conditions.

The present invention has been described in Japanese patent applications Ser. Nos. Showa 60-163149 (1985) and Showa 60-186886 (1985), both of which were filed by an applicant the same as the entity assigned or owed duty of assignment of the present patent application; and the present patent application hereby incorporates into itself by reference the text of said Japanese patent applications and the claims and the drawings thereof; copies are appended to the present application. Further, the present applicant wishes to attract the attention of the examining authorities to the existence of a copending patent application ser. No. Showa 56-143215, which may be considered as relevant to the examination of the present patent application.

In the prior art, there are various types of intake port structures for internal combustion engine cylinder heads, and in particular for so called siamese type cylinder heads. Such intake port structures typically are of the variable swirl siamese type, in which the siamesed intake port comprises a generally straight intake passage and a generally helical intake passage arranged in parallel with said generally straight intake passage, so that both said generally straight intake passage and also said generally helical intake passage receive supply of intake air - fuel mixture from the engine intake manifold, with a control valve selectively at least partially interrupting the flow of air - fuel mixture through said straight intake passage, so as selectively provide extra swirl for the intake air - fuel mixture being sucked into the combustion chamber of the engine, so as to improve combustibility, flame front propagation speed, and firing efficiency and thereby militate against engine knocking, thereby to allow the engine to be operated with a weaker intake air - fuel mixture than would otherwise be practicable. Such a construction typically includes a separating wall which divides between said generally straight intake passage and said generally helical intake passage. And a prior art to the present patent application, Japanese patent application Ser. No. 56-143215 (1981) which has been laid open as Japanese Patent Laying Open Publication Ser. No. 58-48715 (1983) and which was filed by an applicant the same as the applicant of the Japanese patent application of which the priority is being claimed in the present application and to whom either the present application is assigned or is owed a duty of assignment of the present application, discloses an improved siamesed type intake port structure for an internal combustion engine cylinder head which is provided with a bypass air passage through said separating wall, connecting a point on the generally straight intake passage downstream of said control valve provided therein to a vortex end wall of the generally helical intake passage.

With such an intake port structure for an internal combustion engine cylinder head, when the control valve is controlled to be in the closed state by a control system therefor, all of the air - fuel mixture sucked in by the combustion chamber of the engine is inhaled through the generally helical intake passage, and is accordingly imparted with strong swirling; this mode of operation is appropriate for when the engine is operating at low load, as during the idling engine operating condition. In this condition, because of this swirling motion, the limit to which the air - fuel mixture being supplied to the engine can be weakened without engendering deleterious effects is extended. However, at this time the resistance presented to flow of air - fuel mixture by the generally helical intake passage alone is high. On the other hand, when the control valve is controlled to be in the open state by the control system therefor, most of the air - fuel mixture sucked in by the combustion chamber of the engine is inhaled through the generally straight intake passage with only a minor proportion thereof being inhaled through the generally helical intake passage, and accordingly the inhaled air - fuel mixture as a whole is imparted with relatively weak swirling, thus accordingly causing the volumetric efficiency of the engine to be high so as to develop good engine power; this mode of operation is appropriate for when the engine is operating at high load, such as full load. At this time the resistance presented to flow of air - fuel mixture by the combination of the generally straight intake passage and the generally helical intake passage is relatively low.

There is however a problem with such an intake port structure for an internal combustion engine cylinder head, in that, when the control valve is thus controlled to be in the closed state by its control system and all of the air - fuel mixture sucked in by the combustion chamber of the engine is being inhaled through the generally helical intake passage and is accordingly being imparted with strong swirling, although the apparent flame propagation speed is improved and the weak mixture limit is extended, nevertheless because of the swirling of the air - fuel mixture in the combustion chamber the fuel therein is preferentially thrown towards the periphery of the combustion chamber by centrifugal force, and so in the radial direction of the combustion chamber there is created an air/fuel ratio gradient, with the air - fuel mixture at the center portion of the combustion chamber being weaker than the air - fuel mixture at the edge portion thereof. Accordingly, if the air/fuel ratio of the overall air - fuel mixture being supplied to the combustion chamber is near the limit in the weakness direction, then the air/fuel ratio at the center portion of the combustion chamber may become too low for good ignition, and, since in such a three valve type or four valve type internal combustion engine it is convenient and usual to locate the spark plug at the center or approximate center of the combustion chamber, this means that the air/fuel ratio of the air - fuel mixture near and around the ignition portion of said spark plug may become too low for proper ignition. For this reason, according to the conventional art, it is not practicable to push the weakening of the intake air - fuel mixture to the limit, even although good combustion chamber swirling is being provided by such a siamese type intake port structure as detailed above.

Also, as a subsidiary desideratum for such a siamese type intake port structure for such an internal combustion engine cylinder head, it is important that, especially during transient driving conditions, the fuel supply responsiveness of the engine should be as good as possible.

SUMMARY OF THE INVENTION

Accordingly, it is the primary object of the present invention to provide a variable swirl siamese type intake port structure for an internal combustion engine cylinder head, which is improved over the prior art and resolves the problems detailed above.

It is a further object of the present invention to provide such a variable swirl siamese type intake port structure for an internal combustion engine cylinder head, which allows engine output power to be enhanced.

It is a further object of the present invention to provide such a variable swirl siamese type intake port structure for an internal combustion engine cylinder head, which allows engine mechanical octane value to be enhanced.

It is a further object of the present invention to provide such a variable swirl siamese type intake port structure for an internal combustion engine cylinder head, which provides good ignition characteristics for the engine.

It is a further object of the present invention to provide such a variable swirl siamese type intake port structure for an internal combustion engine cylinder head, which allows the engine to be operated with a very weak mixture.

It is a further object of the present invention to provide such a variable swirl siamese type intake port structure for an internal combustion engine cylinder head, which allows for reduction of the flame propagation distance in the engine combustion chambers.

It is a further object of the present invention to provide such a variable swirl siamese type intake port structure for an internal combustion engine cylinder head, which has good characteristics with regard to engine volumetric efficiency.

It is a further object of the present invention to provide such a variable swirl siamese type intake port structure for an internal combustion engine cylinder head, which has good characteristics with regard to transient responsiveness of the engine.

It is a further object of the present invention to provide such a variable swirl siamese type intake port structure for an internal combustion engine cylinder head, which provides good microturbulence in the combustion chambers of the engine.

It is a further object of the present invention to provide such a variable swirl siamese type intake port structure for an internal combustion engine cylinder head, which provides supply of air - fuel mixture of relatively uniform air/fuel ratio to the combustion chambers of the engine.

It is a further object of the present invention to provide such a variable swirl siamese type intake port structure for an internal combustion engine cylinder head, which provides for good combustibility of said air - fuel mixture being supplied to the combustion chambers of the engine.

It is a further object of the present invention to provide such a variable swirl siamese type intake port structure for an internal combustion engine cylinder head, which provides stratified combustion in the combustion chambers of the engine.

According to the most general aspect of the present invention, these and other objects are attained by a variable swirl siamese type intake port structure for an internal combustion engine cylinder head formed with a combustion chamber to which a spark plug having an ignition point is provided, comprising: a first generally straight intake passage which leads to a first intake port opening to said combustion chamber and a second generally helical intake passage which leads to a second intake port, also opening to said combustion chamber, formed with a helical end vortex portion; a control valve fitted in said first generally straight intake passage at an upstream portion thereof so as to control its flow resistance; and: a substantially straight auxiliary passage, opening from a point upstream of said control valve to a point near the downstream end of said first intake port and bypassing said control valve; said substantially straight auxiliary passage pointing through said first intake port, when open, generally at said ignition point of said spark plug. Optionally but typically, the flow resistance of said substantially straight auxiliary passage may be substantially greater both than the flow resistance of said first generally straight intake passage and said first intake port, and the flow resistance of said second generally helical intake passage and said second intake port. If as is typical said spark plug is provided in the generally central portion of said combustion chamber, then said substantially straight auxiliary passage may point through said first intake port, when open, generally in the radial direction of said combustion chamber.

In this variable swirl siamese type intake port structure, when the control valve fitted in the first generally straight intake passage is closed, the stream of air - fuel mixture flowing through the substantially straight auxiliary passage squirts into the combustion chamber, cuts across the vortex flow of air - fuel mixture set up in the combustion chamber by the second generally helical intake passage and said second intake port, and impinges generally on the ignition point of the spark plug, also further entraining some of said swirling vortex flow in it, and thus ensures that the air/fuel ratio of the air - fuel mixture in the vicinity of said spark plug is not weakened by centrifugal effects or the like. Accordingly, even if the average air/fuel ratio for the engine is set relatively very weak, there is no risk engendered of misfiring, since the air/fuel ratio around the ignition point of the spark plug is ensured of being adequate; thus, the limit for weakening the air/fuel ratio for the engine is significantly extended. Further, considerable microturbulence is generated in the air - fuel mixture in the combustion chamber by the above described collision of the straight flow from the generally straight intake passage and the vortex flow from the second generally helical intake passage and the second intake port, and accordingly good combustion is further promoted and the air/fuel ratio weakening limit is further extended. On the other hand, when the control valve fitted in the first generally straight intake passage is open, the stream of air - fuel mixture flowing through the substantially straight auxiliary passage squirts into the combustion chamber to be added to the quantities of air - fuel mixture supplied into the combustion chamber by the first generally straight intake passage and the first intake port as well as the second generally helical intake passage and the second intake port, and thereby the engine volumetric efficiency is increased and its output power level is enhanced. Also, because these air - fuel mixture streams collide in the combustion chamber, again good microturbulence is engendered, and high speed combustion is made available. Thus, even if the spark plug is located in the generally central region of the combustion chamber as is typical with such three valve or four valve engine designs, no problem arises with the ignition of the mixture, and compact combustion is enabled, which increases the mechanical octane value for the engine as well as extending the limit for air - fuel ratio weakening.

Further, according to a particular specialization of the present invention, the above specified and other objects are more particularly attained by a variable swirl siamese type intake port structure for an internal combustion engine cylinder head as specified above, wherein said auxiliary passage points through said first intake port, when open, into said combustion chamber in a direction somewhat to tend to cancel large scale turbulence induced in said combustion chamber by flow through said generally helical intake passage and said second intake port; and further said auxiliary passage may thus in fact point through said first intake port, when open, into said combustion chamber in a direction somewhat to that side of said ignition point of said spark plug in the direction to tend to cancel large scale turbulence induced in said combustion chamber by flow through said generally helical intake passage and said second intake port.

According to such a structure, the deleterious centrifugal effects in the combustion chamber are further remedied, and good microturbulence in the combustion chamber is further encouraged.

Further, according to a particular specialization of the present invention, the above specified and other objects are more particularly attained by a variable swirl siamese type intake port structure for an internal combustion engine cylinder head as specified above, wherein said auxiliary passage opens from said first generally straight intake passage at a point substantially directly upstream of said control valve; and optionally the intake port structure may further comprise a dividing wall which separates said first generally straight intake passage from said second generally helical intake passage, and then said auxiliary passage should desirably open from said first generally straight intake passage at a point substantially downstream of the upstream edge of said dividing wall.

According to such a structure, when the control valve is in the closed operational condition, the extra supply of air - fuel mixture provided to the combustion chamber through the auxiliary passage improves the response of fuel supply during transient engine operational conditions. Since the intake or upstream end of the auxiliary passage is substantially directly upstream of the control valve, when said control valve is closed, all of the liquid fuel which has condensed on the sides of the intake plenum and of the first generally straight intake passage trickles down to be swept into said upstream end of the auxiliary passage at a relatively high speed, thus further improving the responsiveness of the fuel supply to the engine in transient operational conditions. Since the dividing 10 wall which separates the first generally straight intake passage from the second generally helical intake passage extends upstream beyond said said upstream end of the auxiliary passage, the proportion of fuel supplied to the engine which goes through said auxiliary passage is increased, and so a rich mixture very suitable for combustion is preferentially provided in the central region of the combustion chamber. This effectively provides stratified combustion.

BRIEF DESCRIPTION OF THE DRAWINGS

The present invention will now be described with respect to the preferred embodiments thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the various figures relating to one preferred embodiment, and like parts and gaps and spaces and so on in the figures relating to different preferred embodiments; and:

DESCRIPTION OF THE PREFERRED EMBODIMENTS

The present invention will now be described with reference to the preferred embodiments thereof, and with reference to the figures.

THE FIRST PREFERRED EMBODIMENT

Construction

Figure 1:
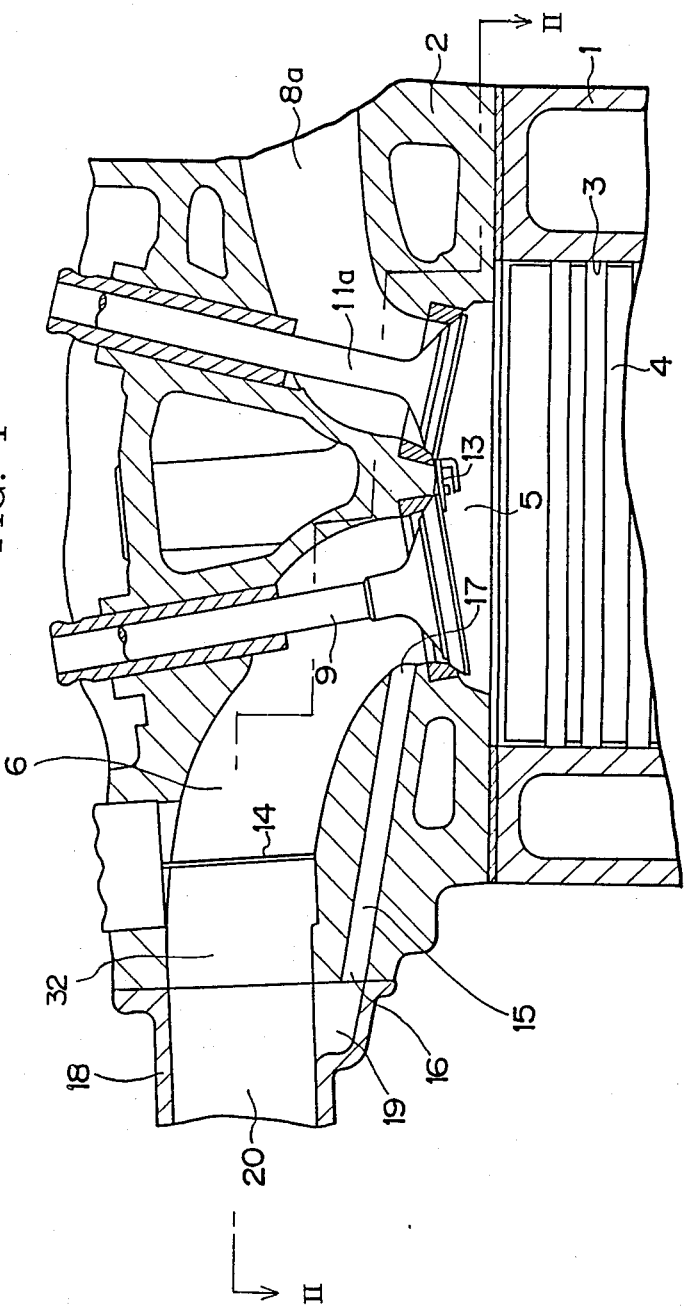
FIG. 1 is an axial longitudinal sectional view showing an internal combustion engine cylinder bore, a piston slidably fitted in said cylinder bore, a portion of a cylinder head incorporating the first preferred embodiment of the variable swirl siamese type intake port structure of the present invention fitted over said cylinder bore, and a combustion chamber defined by said cylinder bore and said portion of said cylinder head, this sectional view being taken in a somewhat distorted plane shown by the arrows I—I in FIG. 2.
Figure 2:
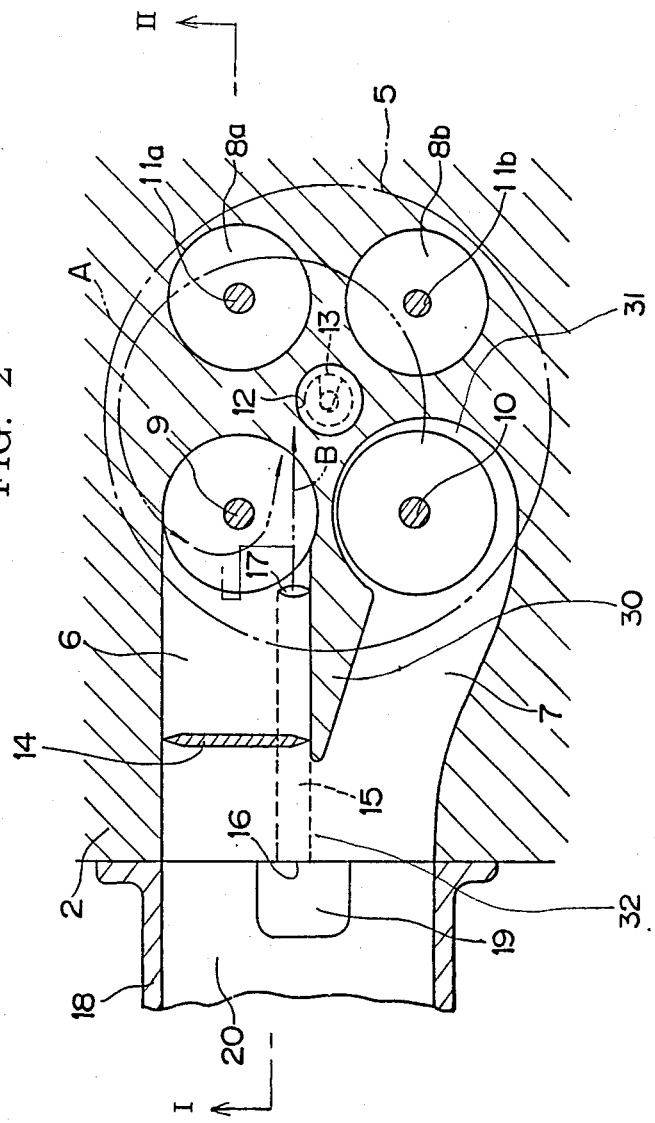
FIG. 2 is a transverse sectional view taken through said cylinder head incorporating said first preferred embodiment structure of the present invention as seen from underneath the cylinder head looking upwards, the sectional plane of this drawing being somewhat distorted and being generally indicated by the arrows II—II in FIG. 1.

In the first preferred embodiment of the cylinder head intake port structure of the present invention, shown in longitudinal sectional view in FIG. 1 and in transverse sectional view in FIG. 2, the reference numeral 1 denotes the cylinder block of the engine, while on this cylinder block 1 there is fitted a cylinder head, which is the first preferred embodiment of the cylinder head intake port structure of the present invention, denoted by the reference numeral 2. The cylinder block 1 is formed with a plurality of cylinder bores 3 of which only one is shown in FIG. 1 because the section of FIG. 1 is taken in a plane including the central longitudinal axis of said shown cylinder bore 3 and substantially perpendicular to the plane including the central longitudinal axes of all said cylinder bores 3. In this cylinder bore 3 there reciprocates a piston 4, and between said piston 4, said cylinder head 2, and the upper portion of said cylinder bore 3 there is defined a combustion chamber 5 for this piston and cylinder. And the fitting of the cylinder head 2 to the cylinder block 1 is done by the use of cylinder head bolts, not particularly shown, fitted through cylinder head bolt holes formed in bosses, not particularly shown, formed in the cylinder head 2 between each pair of adjacent cylinders and at the ends of the row of cylinders.

For each cylinder, the cylinder head 2 is formed with two intake ports 6 and 7 and two exhaust ports 8a and 8b, all four of which which open via respective valve seats to the combustion chamber 5, with the centers of said four valve seats approximately at the corners of a square, as generally shown in FIG. 2. Thus, this internal combustion engine is of the four valve per cylinder type. And the intake ports 6 and 7 for each of the cylinders of this engine are arranged on the one side of the cylinder block 1 and the cylinder head 2, in the longitudinal direction of said cylinder head 2 along the row of cylinders thereof (which corresponds to the direction perpendicular to the drawing paper in FIG. 1 and to the horizontal direction in FIG. 2); and, similarly, the exhaust ports 8a and 8b for each of the various cylinders are arranged on the other side to said one side of the cylinder block 1 and of the cylinder head 2. Poppet valves 9 and 10 (of which only the poppet valve 9 can be seen in the sectional view of FIG. 1) of a per se known type, mounted in per se known valve guides fitted in the cylinder head 2, are provided for cooperating with intake valve seats inset around the edges of each of the intake ports 6 and 7 where they open to the combustion chamber 5, so as to provide open/close control of communication between said intake ports 6 and 7 and the combustion chamber 5; and two other poppet valves 11a and 11b, also per se known and mounted in per se known valve guides fitted in the cylinder head 2, and again only one of which can be seen in FIG. 1, are provided for similarly cooperating with exhaust valve seats inset around the edges of the exhaust ports 8a and 8b where they open to the combustion chamber 5, so as similarly to provide open/close control of communication between the communication between said exhaust ports 8a and 8b and said combustion chamber 5. And by actuation of these intake poppet valves 9 and 10 and exhaust poppet valves 11a and 11b by a per se known type of valve gear not particularly shown, the internal combustion engine is caused to operate according to an Otto cycle so as to generate rotational power, as is per se conventional. And, as best seen in FIG. 2, substantially in the middle of the portion of the cylinder head 2 defining the roof of the combustion chamber 5 there is formed a screwed hole 12 for fitting a spark plug 13 thereinto.

In more detail, the cylinder head is formed with an intake plenum 32 opening at its outside left side as seen in the figures, and this intake plenum branches into the two intake ports 6 and 7. The intake port 6 is formed as a generally straight intake passage, while the other intake port 7 is formed as a generally helical intake passage. A flow of air - fuel mixture is sucked into the combustion chamber 5 of the engine from a carburetor, not particularly shown, fitted to an intake manifold 18 which is fitted to this cylinder head 2 and is formed with an intake passage 20 abutted against the intake plenum 32. This flow of air - fuel mixture first enters the cylinder head 2 into the intake plenum 3 upstream of the two intake ports 6 and 7, and then is divided by impinging upon the upstream edge of a dividing wall 30 which separates said two intake ports 6 and 7, so that part of said air - fuel mixture flow enters into the upstream end of the generally straight intake port 6 while the remainder of said air - fuel mixture flow enters into the upstream end of the generally helical intake port 7. The generally straight intake port 6 debouches into the combustion chamber 5 through the valve seat controlled by the intake poppet valve 9, while the generally helical intake port 7 debouches into the combustion chamber 5 through the valve seat controlled by the other intake poppet valve 10. Thus, the lower side as seen in the view of FIG. 2 of the downstream portion of the air - fuel mixture intake system defines the generally helical intake port 7, so that air - fuel mixture flowing through this generally helical intake port 7, when the intake poppet valve 10 is opened of course, impinges against a vortex portion 31 formed around the stem of said intake poppet valve 10 in said helical port 7 and is imparted with substantial swirling motion.

In the upstream end or intake end of the generally straight intake port 6, just where said generally straight intake port 6 branches off from the intake plenum 32, there is provided a butterfly type air - fuel mixture intake control valve 14, which is fixedly mounted on a shaft not particularly shown and is selectively positioned via said shaft by an actuating device of a per se well known sort, likewise not particularly shown, to either one of a closed position as shown in FIG. 2 in which said air - fuel mixture intake control valve 14 substantially closes said upstream end of said generally straight intake port 6 while of course leaving uninterfered-with said generally helical intake port 7, or an open position, angularly spaced approximately 90½ from said shown closed position, in which said air - fuel mixture intake control valve 14 substantially leaves said upstream end of said generally straight intake port 6 open and uninterfered with. For example, this air - fuel mixture intake control valve 14 may be controlled by said actuating device so as substantially to close said generally straight intake port 6, when and only when engine load is below a certain determinate value.

Particularly according to the inventive concept of the present invention, a substantially straight auxiliary passage 15 extends from an intake portion 16 located in the intake plenum 32 upstream of the air - fuel mixture intake control valve 14, along substantially parallel to, as seen in plan view, and slightly below the generally straight intake port 6, to an outlet portion 17 located proximate to the valve seat at the downstream end of said generally straight intake port 6, i.e. to the valve seat controlled by the one 9 of the intake poppet valves. This auxiliary passage 15 is as shown in the figures substantially straight and slopes relatively gently downwards, considering the engine in the orientation shown in FIG. 1 which is a typical operating orientation therefor. Thus, said substantially straight auxiliary passage 15 bypasses the air - fuel mixture intake control valve 14, and leads a certain quantity of the air - fuel mixture supplied by the carburetor (not particularly shown) to the intake passage 20 formed in the intake manifold 18, directly to just upstream of the intake poppet valve 9. Particularly according to the present invention, this substantially straight auxiliary passage 15, when said poppet valve 9 is open, points generally at the igniting portion of the spark plug 13; although, more exactly, according to a particular feature of the shown first preferred embodiment of the present invention, said substantially straight auxiliary passage 15 in fact points slightly to the upper side as seen in the FIG. 2 view of said igniting portion of the spark plug 13, i.e. as will be explained later slightly on the side thereof against the direction of the swirl induced by the generally helical intake port 7. Also, according to a particular distinguishing feature of this first preferred embodiment of the cylinder head intake port structure of the present invention, the upstream end portion 16 of this substantially straight auxiliary passage 15 opens, not to the floor of the intake plenum 2, but to the outer face of the cylinder head 2 on the left side in the figures. Corresponding to said upstream end portion 16 of the substantially straight auxiliary passage 15 and abutting thereagainst, on the mating face of the intake manifold 18 there is formed a pocket 19, located on the lower side in FIG. 1 of the opening of the intake passage 20 to said intake manifold 18 mating face. The cross sectional area of the substantially straight auxiliary passage 15 is substantially less than the cross sectional areas of the generally straight intake port 6 and the generally helical intake port 7, being about one fifth thereof in a typical constructional implementation.

Operation

This first preferred embodiment of the intake port structure of the present invention operates as follows.

When the air - fuel mixture intake control valve 14 is in the closed operational condition—typically as mentioned above when engine load is lower than a determinate value—then flow of air - fuel mixture through the generally straight intake port 6 is interrupted, and most of the air - fuel mixture flow inhaled by the engine from the carburetor (not shown) through the intake manifold 18 enters into the upstream end of the generally helical intake port 7, and passes through the intake valve port controlled by the intake poppet valve 10 into the combustion chamber 5 with a substantial amount of swirling being imparted to said sucked in air - fuel mixture as it enters said combustion chamber 5 by the vortex portion 31 formed around the stem of said intake poppet valve 10; this swirling is, as shown by the arrow A in FIG. 2, in the counterclockwise direction in the figure around the central axis of the cylinder bore 3. However, a certain relatively small amount of air - fuel mixture is also sucked, from the intake passage 20 of the intake manifold 18 through the pocket 19, through the substantially straight auxiliary passage 15 sloping relatively gently downwards, and comes squirting out of the downstream end of said substantially straight auxiliary passage 15 substantially straight at the ignition point of the spark plug 13 in a direct stream as shown by the arrow "B" in FIG. 2, cutting substantially radially across the aforementioned counterclockwise swirling flow "A" of the main flow of sucked in air - fuel mixture. Thereby, the initially centrifugally dispersed air - fuel mixture in said counterclockwise swirling flow "A" is entrained into said direct flow "B" and is sucked towards the ignition point of the spark plug 13 along with said direct flow "B", thus ensuring that the air - fuel mixture in the center area of the combustion chamber 5 is not particularly weaker than the air - fuel mixture at the edge area thereof - in contrast to what was the case with the prior art as described earlier in this specification. Therefore, even if the overall air/fuel ratio as supplied by the carburetor (not particularly shown) is set to be relatively weak, a relative plenitude of fuel is available near the ignition point of the spark plug 13, and accordingly good ignition performance becomes available, and engine misfiring is not liable to occur. Further, since the collision of the counterclockwise swirling flow "A" with the direct flow "B" engenders microturbulence in the mixed flow, the ignition characteristics of the resulting mixture flow are further improved, and thereby the limit for weakening the air - fuel mixture is further extended. And, since the direct flow "B" collides with the counterclockwise swirling flow "A" near the final point of said counterclockwise swirling flow "A", said direct flow "B" does not greatly attenuate said counterclockwise swirling flow "A". Yet further, since, according to the previously mentioned particular feature of the shown first preferred embodiment of the present invention, the direct flow "B" spurting out of the substantially straight auxiliary passage 15 in fact is aimed slightly to the upper side as seen in the FIG. 2 view of the igniting portion of the spark plug 13, i.e. slightly on the side of said spark plug 13 against the direction of the swirling air - fuel flow "A" in the combustion chamber 5 induced by the generally helical intake port 7, thereby the macroturbulence or large scale swirling of the mixture in the combustion chamber 5 in the collision area between the direct flow "B" and the counterclockwise swirling flow "A" is partially cancelled, thereby again improving ignition performance, militating against engine misfiring, improving ignition characteristics, and further extending the limit for weakening the air - fuel mixture.

On the other hand, when the air - fuel mixture intake control valve 14 is in the open operational condition—typically when engine load is greater than the previously mentioned determinate value—then most of the air - fuel mixture flow inhaled by the engine from the carburetor (not shown) through the intake manifold 18 enters into the combustion chamber 5 through the generally straight intake port 6, with only a minor amount passing through the generally helical intake port 7. Accordingly, only a relatively low amount of swirling as a whole is imparted to said sucked in air - fuel mixture as it enters said combustion chamber 5 by the vortex portion 31 formed around the stem of the intake poppet valve 10. Thus, good volumetric efficiency for the engine is obtained. Since a certain relatively small amount of air - fuel mixture is also, in this operational condition as well, sucked through the substantially straight auxiliary passage 15 into the center area of the combustion chamber 5, thereby engine volumetric efficiency is increased even further.

The provision of the pocket 19 on the lower side of the intake manifold 18 where the substantially straight auxiliary passage 15 opens to the intake passage 20 is an important feature of this first preferred embodiment of the present invention. According to this, liquid fuel which has accumulated on the walls of the intake manifold 18 which define the intake passage 20 is able to trickle down into this pocket 19 and thence to flow into the upstream end portion 16 of the auxiliary passage 15 and be transferred through said auxiliary passage 15 to flow out thereof substantially directly above the intake poppet valve 9, thereby to enter virtually directly into the combustion chamber 5. Thereby, speed of fuel supply response is improved.

THE SECOND PREFERRED EMBODIMENT

Figure 3:
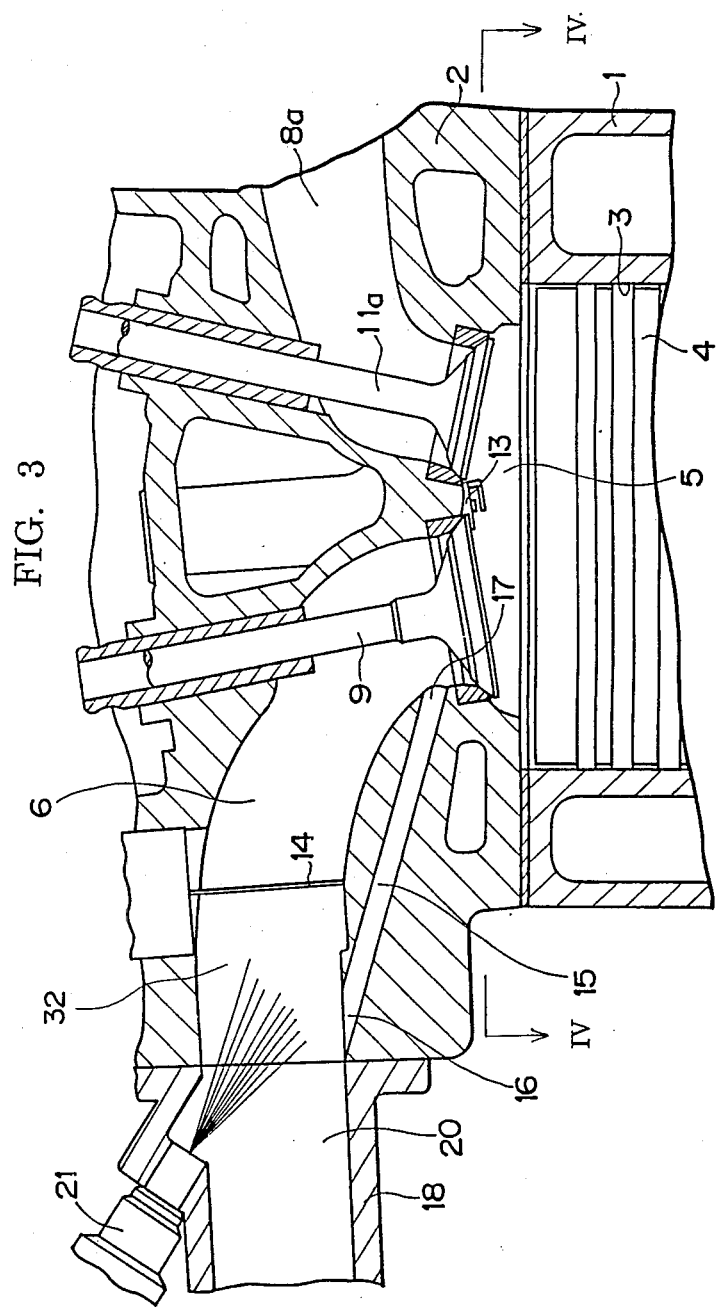
FIG. 3 is an axial longitudinal sectional view, similar to FIG. 1 relating to the first preferred embodiment, showing a cylinder bore, a piston, a portion of a cylinder head incorporating the second preferred embodiment of the variable swirl siamese type intake port structure of the present invention fitted over said cylinder bore, and a combustion chamber defined by said cylinder bore and said portion of said cylinder head, this sectional view being taken in a similarly somewhat distorted plane shown by the arrows III—III in FIG. 4.
Figure 4:
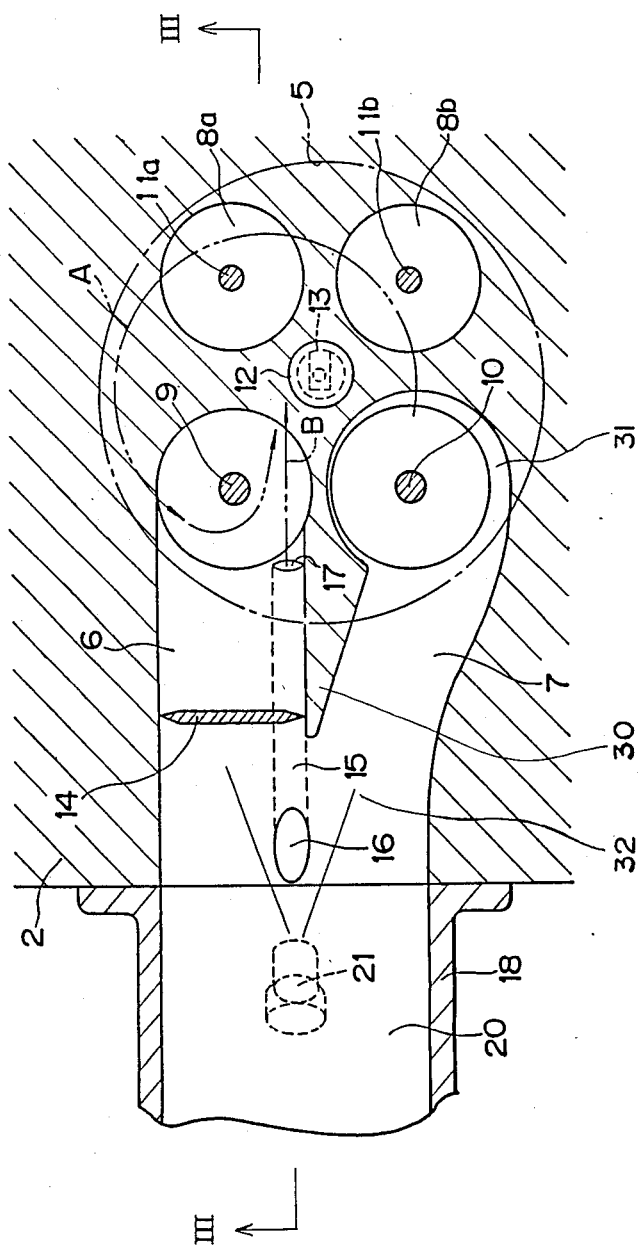
FIG. 4 is a transverse sectional view, similar to FIG. 2 relating to the first preferred embodiment, taken through said second preferred embodiment cylinder head incorporating said second preferred embodiment structure, again as seen from underneath the cylinder head looking upwards, the sectional plane of this drawing similarly being somewhat distorted and being generally indicated by the arrows IV—IV in FIG. 3.

The second preferred embodiment of the cylinder head intake port structure of the present invention is shown in FIGS. 3 and 4, in a similar manner to FIGS. 1 and 2 respectively relating to the first preferred embodiment; and, in FIGS. 3 and 4, like reference numerals to those in FIGS. 1 and 2 denote like parts. This second preferred embodiment differs from the first preferred embodiment described above, in that the upstream end portion 16 of this substantially straight auxiliary passage 15 debouches to the floor of the intake plenum 32, rather than as in the first preferred embodiment debouching to the outer face of the cylinder head 2. Also, to the intake manifold 18 there is fitted a fuel injector 21, which when actuated squirts liquid fuel into the intake passage 20 thereof. Apart from these constructional details, this second preferred embodiment is substantially the same as the first preferred embodiment described above, and operates in substantially the same way: the direct stream designated as "B" of air - fuel mixture that passes through the substantially straight auxiliary passage 15 and squirts out of the downstream end portion 17 thereof is directed substantially at the igniting tip portion of the spark plug 13, and thus, again, even when the air - fuel mixture intake control valve 14 is in the closed operational condition and flow of air - fuel mixture through the generally straight intake port 6 is interrupted, then as before a certain relatively small amount of air - fuel mixture is still sucked from the intake passage 20 of the intake manifold 18 through the substantially straight auxiliary passage 15 and comes squirting out of the downstream end of said substantially straight auxiliary passage 15 substantially straight at the ignition point of the spark plug 13 in the direct stream "B" as shown in FIG. 4. Thereby, as before, the initially centrifugally dispersed air - fuel mixture in the counterclockwise swirling flow "A" provided by the flow of air - fuel mixture through the generally helical intake port 7 is entrained into said direct air - fuel mixture flow "B" and is sucked towards the ignition point of the spark plug 13 along with said direct flow "B", thus ensuring that an overall satisfactory quantity of fuel is available near the ignition point of the spark plug 13, and accordingly as before good ignition performance becomes available, and engine misfiring is prevented and ignition characteristics are improved, and further the limit for weakening the air - fuel mixture is extended.

THE THIRD PREFERRED EMBODIMENT

Figure 5:
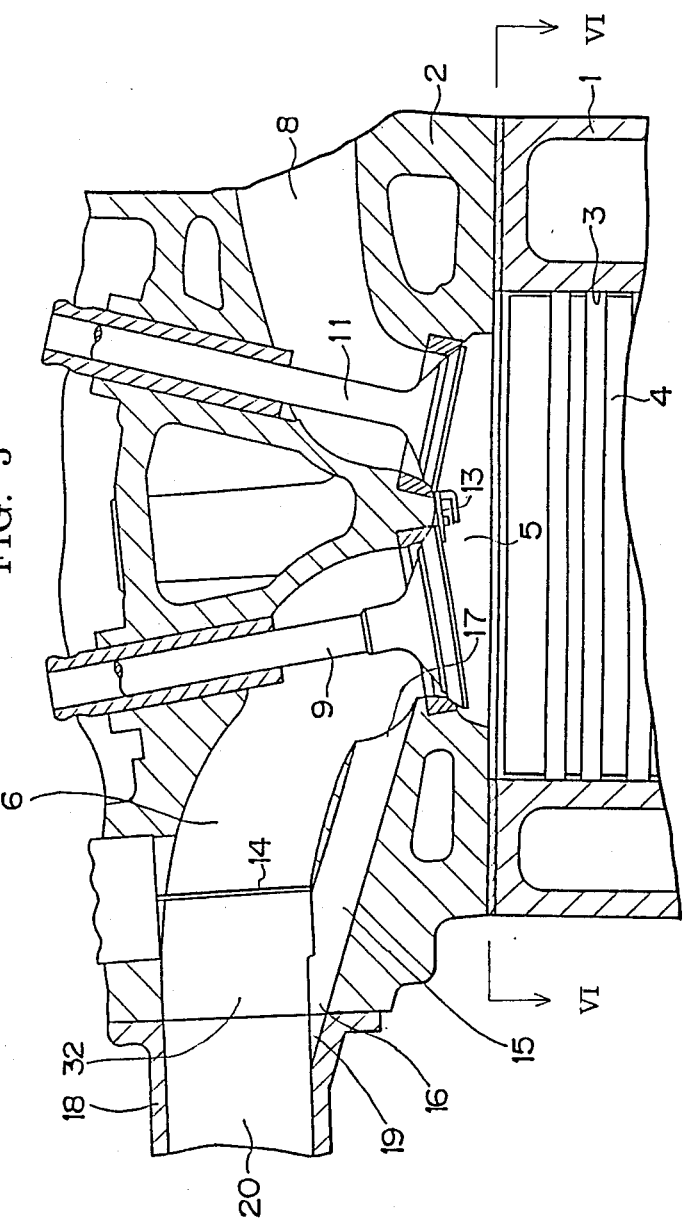
FIG. 5 is an axial longitudinal sectional view, similar to FIG. 1 and relating to the first and second preferred embodiments respectively, showing a cylinder bore, a piston, a portion of a cylinder head incorporating the third preferred embodiment of the variable swirl siamese type intake port structure of the present invention fitted over said cylinder bore, and a combustion chamber defined by said cylinder bore and said portion of said cylinder head, this sectional view being taken in a similarly somewhat distorted plane shown by the arrows V—V in FIG. 6.
Figure 6:
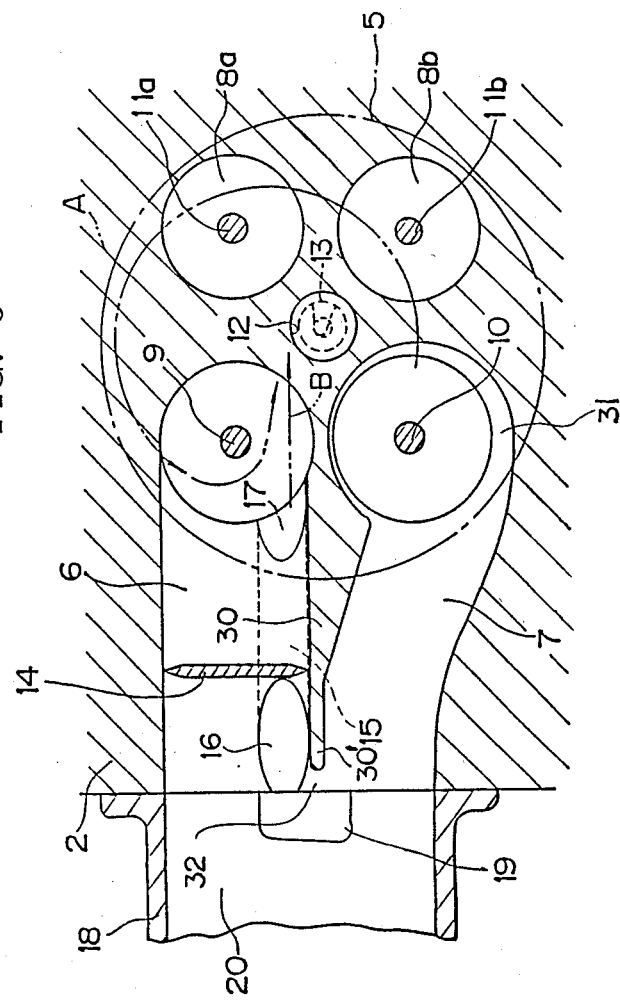
FIG. 6 is a transverse sectional view, similar to FIGS. 2 and 4 relating to the first and second preferred embodiments respectively, taken through said cylinder head incorporating said third preferred embodiment structure, again as seen from underneath the cylinder head looking upwards, the sectional plane of this drawing again being somewhat distorted and being generally indicated by the arrows VI—VI in FIG. 5.

The third preferred embodiment of the cylinder head intake port structure of the present invention is shown in FIGS. 5 and 6, in a similar manner to FIGS. 1 and 2 respectively relating to the first preferred embodiment and FIGS. 3 and 4 respectively relating to the second preferred embodiment; and, in FIGS. 5 and 6, like reference numerals to those in FIGS. 1 through 4 denote like parts. This third preferred embodiment differs from the first and second preferred embodiments described above, in that the upstream end portion 16 of this substantially straight auxiliary passage 15 opens from the floor of the intake plenum 32 substantially just upstream of the air - fuel mixture intake control valve 14, when said valve 14 is in the closed operational condition as shown in FIG. 6, rather than as in the first and second preferred embodiments opening a certain considerable distance upstream of said air - fuel mixture intake control valve 14. In particular, in fact, the greater part of this upstream end portion 16 of the substantially straight auxiliary passage 15 opens from the floor of the intake plenum 32 downstream of the upstream edge of the upstream portion 30' of the dividing wall 30 between the straight and helical intake ports 6 and 7.

This has the following beneficial effects. Since the dividing wall 30 between the straight and helical intake ports 6 and 7 extends so far upstream as to substantially separate the upstream intake end portion 16 of the substantially straight auxiliary passage 15 from the helical intake port 7, the proportion of the air - fuel mixture supplied to the intake port which enters into said upstream end portion 16 of said substantially straight auxiliary passage 15 is even further increased, as compared to the first and second preferred embodiments described above, and accordingly the air/fuel ratio of the air - fuel mixture at the central portion of the combustion chamber 5 around the igniting portion of the spark plug 13 is further diminished, i.e. the mixture is richened, so that stratified combustion is obtained, which is very desirable. Also, even though the spark plug 13 is in the central area of the combustion chamber 5, no problem arises with ignition of the air - fuel mixture, and so called compact combustion becomes possible, as a result of which the weak mixture limit is further pushed back, and the mechanical octane value of the engine is further enhanced.

A further beneficial effect of this third preferred embodiment is that, in all operational circumstances, some of the air - fuel mixture supplied to the intake plenum 32 from the intake manifold 18 is supplied into the straight intake port 6, and, when said air - fuel mixture intake control valve 14 is in the closed operational condition as shown in FIG. 6, some of the fuel in this air - fuel mixture condenses out in liquid form on said air - fuel mixture intake control valve 14 and on the defining surfaces of the straight intake port 6 immediately above said valve 14. This condensed out liquid fuel reliably trickles downwards and enters into the upstream end portion 16 of the substantially straight auxiliary passage 15, to pass down said auxiliary passage 15 and to then exit through the exit portion 17 thereof, to be deposited near the intake poppet valve 9 for entering into the combustion chamber 5 of the engine. Thus, worsening of the fuel supply response during transient engine operational conditions is militated against, and a relatively rich mixture is supplied to the combustion chamber from the straight intake port 6, thus providing a stable rich mixture good for ignition purposes in the ignition region of the spark plug 13, and thus extending even further the weak mixture limit of combustibility. Yet further, since the dividing wall 30 between the straight and helical intake ports 6 and 7 has the upstream portion 30', thereby, when the air - fuel mixture intake control valve 14 is in the closed operational condition, the supply of air - fuel mixture to the straight intake port 6 is increased, and then the amount of air - fuel mixture flowing through the substantially straight auxiliary passage 15 is increased, thus providing an even more stably rich mixture near the spark plug 13 in the central area of the combustion chamber 5.

As far as the actual place of debouchment of the upstream end portion 16 of the substantially straight auxiliary passage 15 is concerned, this third preferred embodiment is intermediate between the first and the second preferred embodiments detailed above, in that the upstream end portion 16 of the substantially straight auxiliary passage 15 debouches mostly in the floor of the intake plenum 32, but somewhat in the outer face of the cylinder head 2, where a relatively small fuel collection pocket 19 like the pocket 19 of the first preferred embodiment is defined; thereby the advantages of the first and second preferred embodiments as far as this portion of the construction is concerned are combined.

Although the present invention has been shown and described in terms of the preferred embodiments thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. A variable swirl siamese type intake port structure for an internal combustion engine cylinder head formed with a combustion chamber to which a spark plug having an ignition point is provided, comprising:
    a first generally straight intake passage which leads to a first intake port opening to said combustion chamber and a second generally helical intake passage which leads to a second intake port, also opening to said combustion chamber, formed with a helical end vortex portion;
    a control valve fitted in said first generally straight intake passage at an upstream portion thereof so as to control its flow resistance; and:
    a substantially straight auxiliary passage, opening from a point upstream of said control valve to a point near the downstream end of said first intake port and bypassing said control valve;
    said substantially straight auxiliary passage pointing through said first intake port, when open, generally at said ignition point of said spark plug.

2. A variable swirl siamese type intake port structure for an internal combustion engine cylinder head according to claim 1, wherein the flow resistance of said substantially straight auxiliary passage is substantially greater both than the flow resistance of said first generally straight intake passage and said first intake port, and the flow resistance of said second generally helical intake passage and said second intake port.

3. A variable swirl siamese type intake port structure for an internal combustion engine cylinder head according to claim 1, said spark plug being provided in the generally central portion of said combustion chamber, wherein said substantially straight auxiliary passage points through said first intake port, when open, generally in the radial direction of said combustion chamber.

4. A variable swirl siamese type intake port structure for an internal combustion engine cylinder head according to claim 1, wherein said auxiliary passage points through said first intake port, when open, into said combustion chamber in a direction somewhat to tend to cancel large scale turbulence induced in said combustion chamber by flow through said generally helical intake passage and said second intake port.

5. A variable swirl siamese type intake port structure for an internal combustion engine cylinder head according to claim 1, wherein said auxiliary passage points through said first intake port, when open, into said combustion chamber in a direction somewhat to that side of said ignition point of said spark plug in the direction to tend to cancel large scale turbulence induced in said combustion chamber by flow through said generally helical intake passage and said second intake port.

6. A variable swirl siamese type intake port structure for an internal combustion engine cylinder head according to claim 3, wherein said auxiliary passage points through said first intake port, when open, into said combustion chamber in a direction somewhat inclined to the radial direction thereof in the sense to tend to cancel large scale turbulence induced in said combustion chamber by flow through said generally helical intake passage and said second intake port.

7. A variable swirl siamese type intake port structure for an internal combustion engine cylinder head according to claim 3, wherein said auxiliary passage points through said first intake port, when open, into said combustion chamber in a direction somewhat angled from the radial direction of said combustion chamber to that side of said ignition point of said spark plug in the direction to tend to cancel large scale turbulence induced in said combustion chamber by flow through said generally helical intake passage and said second intake port.

8. A variable swirl siamese type intake port structure for an internal combustion engine cylinder head according to of claim 1 wherein said auxiliary passage opens from said first generally straight intake passage at a point substantially directly upstream of said control valve.

9. A variable swirl siamese type intake port structure for an internal combustion engine cylinder head according to claim 7, further comprising a dividing wall which separates said first generally straight intake passage from said second generally helical intake passage, wherein said auxiliary passage opens from said first generally straight intake passage at a point substantially downstream of the upstream edge of said dividing wall.

* * * * *